United States Patent
Gam et al.

(10) Patent No.: US 10,577,510 B2
(45) Date of Patent: Mar. 3, 2020

(54) ELECTROCOATING COMPOSITION INCLUDING AN ANTI-CRATER AGENT

(71) Applicant: AXALTA COATING SYSTEMS IP CO., LLC, Wilmington, DE (US)

(72) Inventors: Allisa Gam, Troy, MI (US); Jozef Theresia Huybrechts, Turnhout (BE)

(73) Assignee: AXALTA COATING SYSTEMS IP CO. LLC, Wilmington, DE (US)

( * ) Notice: Subject to any disclaimer, the term of this patent is extended or adjusted under 35 U.S.C. 154(b) by 85 days.

(21) Appl. No.: 15/940,111

(22) Filed: Mar. 29, 2018

(65) Prior Publication Data

US 2018/0282557 A1   Oct. 4, 2018

Related U.S. Application Data

(60) Provisional application No. 62/479,589, filed on Mar. 31, 2017.

(51) Int. Cl.
| | |
|---|---|
| C09D 5/44 | (2006.01) |
| C09D 7/65 | (2018.01) |
| C25D 13/04 | (2006.01) |

(52) U.S. Cl.
CPC ......... *C09D 5/4476* (2013.01); *C09D 5/4438* (2013.01); *C09D 5/4453* (2013.01); *C09D 5/4457* (2013.01); *C09D 5/4473* (2013.01); *C09D 7/65* (2018.01); *C25D 13/04* (2013.01)

(58) Field of Classification Search
CPC ... C09D 5/4438; C09D 5/4453; C09D 5/4457
See application file for complete search history.

(56) References Cited

U.S. PATENT DOCUMENTS

| | | | | |
|---|---|---|---|---|
| 4,920,162 A | * | 4/1990 | Clark | C09D 5/4434 523/400 |
| 5,260,354 A | † | 11/1993 | Kaylo | |
| 5,427,661 A | * | 6/1995 | Geist | C09D 5/4457 204/500 |
| 5,441,995 A | * | 8/1995 | Ohgaki | C08G 81/00 523/404 |
| 7,264,705 B2 | | 9/2007 | Gam et al. | |
| 2006/0084726 A1 | * | 4/2006 | Gam | G08G 18/0823 523/415 |
| 2012/0175261 A1 | * | 7/2012 | Gam | C09D 5/4492 205/50 |
| 2013/0090412 A1 | * | 4/2013 | Gam | C09D 5/4465 523/400 |

FOREIGN PATENT DOCUMENTS

| | | | |
|---|---|---|---|
| JP | H5140489 | † | 6/1993 |
| JP | H10110125 | † | 4/1998 |

\* cited by examiner
† cited by third party

*Primary Examiner* — Marc S Zimmer
(74) *Attorney, Agent, or Firm* — Lorenz & Kopf, LLP

(57) ABSTRACT

An electrocoating composition is provided herein. The electrocoating composition includes an aqueous carrier. The electrocoating composition further includes a film forming binder. The film forming binder includes an epoxy-amine adduct and a blocked polyisocyanate crosslinking agent. The electrocoating composition further includes an anti-crater agent selected from the group of a polyester resin dispersion, a polyacrylate resin dispersion, and a combination thereof. The electrocoating composition further includes a supplemental anti-crater agent including a polyether modified polysiloxane.

15 Claims, No Drawings

ELECTROCOATING COMPOSITION INCLUDING AN ANTI-CRATER AGENT

CROSS-REFERENCE TO RELATED APPLICATION

This application is a U.S. Non-provisional Patent Application which claims priority to U.S. Provisional Application No. 62/479,589, filed Mar. 31, 2017, which is hereby incorporated in its entirety by reference.

TECHNICAL FIELD

The technical field generally relates to electrocoating compositions for coating substrates.

BACKGROUND

The coating of electrically conductive substrates by an electrodeposition process also called an electrocoating process is a well-known and important industrial process. Electrodeposition of primers to automotive substrates is widely used in the automotive industry. In this process, a conductive article, such as an autobody or an auto part, is immersed in a bath of a coating composition of an aqueous emulsion of film forming polymer and acts as an electrode in the electrodeposition process. An electric current is passed between the article and a counter-electrode in electrical contact with the aqueous emulsion, until a desired coating is deposited on the article. In a cathodic electrocoating process, the article to be coated is the cathode and the counter-electrode is the anode.

Resin compositions used in the bath of a typical cathodic electrodeposition process also are well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent and then neutralized with an acid to form a water emulsion, which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at sufficient temperature to produce a crosslinked finish on the article.

A continuing problem with cathodic electrocoating compositions has been the presence of craters in the cured finish. Craters may be caused by oils from manufacturing of the article or lubricants utilized in the conveyors. Conventional attempts to reduce the presence of craters have not only failed to reduce the presence of craters, but have also had a negative impact on properties of the electrocoat layer, subsequent coating layers applied thereto, or both.

Accordingly, it is desirable to provide electrocoating composition exhibiting reduced craters and excellent performance properties. Furthermore, other desirable features and characteristics will become apparent from the subsequent detailed description and the appended claims, taken in conjunction with this background.

BRIEF SUMMARY

An electrocoating composition is provided herein. The electrocoating composition includes, but is not limited to, an aqueous carrier. The electrocoating composition further includes, but is not limited to, a film forming binder. The film forming binder includes, but is not limited to, an epoxy-amine adduct and a blocked polyisocyanate crosslinking agent. The electrocoating composition further includes, but is not limited to, an anti-crater agent selected from the group of a polyester resin dispersion, a polyacrylate resin dispersion, and a combination thereof. The electrocoating composition further includes, but is not limited to, a supplemental anti-crater agent including a polyether modified polysiloxane.

DETAILED DESCRIPTION

The following detailed description is merely exemplary in nature and is not intended to limit coating compositions as described herein. Furthermore, there is no intention to be bound by any theory presented in the preceding background or the following detailed description.

An electrocoating composition for coating a substrate is provided herein. The electrocoating composition may be utilized to coat any type of substrate known in the art. In embodiments, the substrate is a vehicle, automobile, or automobile vehicle. "Vehicle" or "automobile" or "automobile vehicle" includes an automobile, such as, car, van, minivan, bus, SUV (sports utility vehicle); truck; semi-truck; tractor; motorcycle; trailer; ATV (all-terrain vehicle); pickup truck; heavy duty mover, such as, bulldozer, mobile crane and earth mover; airplanes; boats; ships; and other modes of transport.

The electrocoating composition is utilized to form a coating layer on the substrate. The electrocoating composition includes an anti-crater agent for reducing the presence of craters in the coating layer. The terminology "craters" as utilized herein refers to surface defects in a surface of a coating layer that typically have an appearance of circular cavities extending into the surface of the coating layer. The anti-crater agent may be selected from the group of a polyester resin dispersion, a polyacrylate resin dispersion, and a combination thereof. The anti-crater agent may be utilized in an amount of from about 0.01 to about 10 wt. % based on a total weight percent of the electrocoating composition.

The polyester resin dispersion may be further defined as a highly-branched water-reducible polyester. The polyester resin dispersion may be formed by first reacting a carboxylic acid anhydride and a hydroxy-functional cyclic carbonate to form a first adduct with a primary carboxyl group at one terminus and a cyclic carbonate at the other terminus. In embodiments, this first reaction proceeds at a temperature of from about 90° C. to about 150° C. and in the presence of a catalyst. Examples of suitable catalysts include, but are not limited to, triphenylphosphine, ethyltriphenylphosphonium iodide, or a combination thereof. The first reaction proceeds to completion when a predetermined acid number is achieved of from about 132 to about 136 mg KOH/g. The first reaction may proceed to completion for a time period in an amount of from about 10 minutes to about 24 hours. It is to be appreciated that a reaction of a carboxylic acid, instead of the carboxylic acid anhydride, and the hydroxy-functional cyclic carbonate may require esterification by condensation thereby eliminating water which may then require removal of the water by distillation. To this end, polyesterification should be avoided in various embodiments.

In embodiments, the equivalent ratio of anhydride of carboxylic acid anhydride to hydroxy of the hydroxy-functional cyclic carbonate is of from about 0.8:1 to about 1.2:1 (the anhydride being considered monofunctional) to obtain maximum conversion to the desired reaction product. In certain embodiments, the equivalent ratio of anhydride to hydroxy is about 1:1. Equivalent ratios of less than 0.8:1 can be utilized but such ratios may result in increased formation of less desired polyesterification products.

In embodiments, among the carboxylic acid anhydrides which can be utilized in the formation of the primary carboxyl groups of the first adduct are those which exclusive of the carbon atoms in the anhydride moiety contain from about 2 to 30 carbon atoms. Examples include, but are not limited to, aliphatic, including cycloaliphatic, olefinic and cycloolefinic anhydrides and aromatic anhydrides. Substituted aliphatic and aromatic anhydrides are also included within the definition of aliphatic and aromatic provided the substituents do not adversely affect the reactivity of the anhydride or the properties of the resultant polyester. Examples of substituents include, but are not limited to, halogen, alkyl, and alkoxy groups. In embodiments, aromatic anhydrides are generally not preferred due to their poor weathering characteristics.

Examples of suitable aliphatic acid anhydrides include, but are not limited to, phthalic anhydride, maleic anhydride, succinic anhydride, hexahydrophthalic anhydride, tetrahydrophthalic anhydride, and methylhexahydrophthalic anhydride. In embodiments, the carboxylic acid anhydride is further defined as a succinic anhydride. Examples of suitable succinic anhydrides include, but are not limited to, hexadecenylsuccinic anhydride, octenylsuccinic anhydride, octadecenylsuccinic anhydride, tetradecenylsuccinic anhydride, dodecenylsuccinic anhydride, and octadecenylsuccinic anhydride. In embodiments, succinic anhydrides are suitable to their long chain hydrocarbons of from at least 4 carbon atoms or alternatively of from at least 6 to 18 carbon atoms, exclusive of the carbon atoms in the anhydride moiety, which provide for good stability and the proper hydrophilic/hydrophobic balance in the final coating composition. In certain embodiments, the carboxylic acid anhydride is selected from the group of dodecenylsuccinic anhydride, octadecenylsuccinic anhydride, and a combination thereof.

In embodiments, among the hydroxy-functional cyclic carbonate that can be utilized are those which contain active hydrogen atoms with one or more hydroxy-functional groups. These cyclic carbonates are well known in the art. Hydroxy-functional cyclic carbonates of various ring sizes as are known in the art may be utilized. In embodiments, five-membered ring cyclic carbonates, six-membered ring cyclic carbonates, or a combination thereof may be utilized. In certain embodiments, five-membered ring cyclic carbonates are utilized due to their greater degree of commercial availability. Examples of suitable five-membered cyclic carbonates that contain a hydroxyl group include, but are not limited to, 1,3-dioxolan-2-one-4-propanol, 1,3-dioxolan-2-one-butanol, 1,3-dioxolan-2-one-pentanol, and the like. Examples of suitable six-membered cyclic carbonates that contain a hydroxyl group include, but are not limited to, 1,3-dioxolan-2-one-2,2-diethylpropanol, 1,3-dioxolan-2-one-2,2-dimethylpropanol, and the like. In certain embodiments, the hydroxy-functional cyclic carbonate is further defined as a five-membered cyclic carbonate including a 1,3-dioxolan-2-one group, such as 1,3-dioxolan-2-one-propanol which is commonly referred to in the art as glycerin carbonate.

In embodiments, the carboxyl group of the first adduct is chain extended to introduce additional hydrocarbon chains into the molecule for improved stability and improved hydrophilic/hydrophobic balance. In certain embodiments, the carboxyl group is chain extended by first reacting the carboxyl group of the first adduct with a monofunctional epoxy resin to form a second adduct with a hydroxy group at one terminus and a cyclic carbonate at the other terminus. This first portion of the chain extension reaction proceeds to completion when a predetermined acid number is achieved of less than 20 mg KOH/g or alternatively less than 5 mg KOH/g. In certain embodiments, the monofunctional epoxy resin is further defined as monoglycidyl ether. The chain extension reaction may be continued by reacting the hydroxyl group of the second adduct with additional acid anhydride to form a third adduct with a carboxyl group at one terminus and a cyclic carbonate at the other terminus. This second portion of the chain extension reaction proceeds to completion when a predetermined acid number is achieved of greater than 40 mg KOH/g or alternatively greater than 50 mg KOH/g. The chain extension reactions may proceed under similar conditions and utilize similar reagents are described above.

In embodiments, among the monoglycidyl ethers which can be used in the chain extension reaction are those that have 1,2-epoxy equivalency of about 1, that is, monoepoxides which have on an average basis one epoxy group per molecule. These epoxy compounds can be saturated, unsaturated, aliphatic, cycloaliphatic, aromatic or heterocyclic. These epoxy compounds may contain substituents such as halogen, hydroxy, ether, alkyl and/or aryl groups provided the substituents do not adversely affect the reactivity of the adduct or the properties of the resultant polyester.

In embodiments, suitable monoepoxy compounds which exclusive of the carbon atoms in the epoxy moiety contain from 4 to 18 carbon atoms. In certain embodiments, the monoepoxy compound is further defined as a monoglycidyl ether of long chain, i.e., C4 or higher, monohydric alcohol. Examples of suitable monoglycidyl ethers include, but are not limited to, alkyl, cycloalkyl, alkylalkoxysilane, aryl and mixed aryl-alkyl-monoglycidyl ethers, such as, o-cresyl glycidyl ether, phenyl glycidyl ether, butyl glycidyl ether, octyl glycidyl ether, dodecyl glycidyl ether, glycidoxypropyltrimethoxysilane, and glycidoxypropyltriethoxysilane, 2-ethylhexyl monoglycidyl ether. In various embodiments, the monoglycidyl ether may be selected from the group of 2-ethylhexyl monoglycidyl ether, the combination of glycidoxypropyltrimethoxysilane and 2-ethylhexyl monoglycidyl ether, or a combination thereof. Other useful long chain epoxy compounds having one epoxy group will readily occur to one skilled in the art.

In embodiments, among the acid anhydrides, any of the aforementioned acid anhydrides can be utilized in the chain extension reaction. In embodiments, the equivalent ratio of carboxyl to hydroxyl groups in this chain extension reaction of from about 0.8:1 to about 1.2:1 to obtain maximum conversion to the chain extended adduct. In certain embodiments, the equivalent ratio of carboxyl to hydroxyl groups is about 1:1.

Formation of the polyester resin dispersion may continue by reacting either the first adduct (not chain extended) or the third adduct (chain extended) with a coupling agent having two or more sites reactive with active hydrogen groups to form a di- or higher adduct (i.e., branched polyester adduct) with terminal cyclic carbonate groups. The amount of coupling agent is primarily selected, relative to the carboxyl groups, to secure an acid number in the range of 0 to 10, for each 100 grams of resin, to provide the best balance of water solubilization and low excess carboxyl value.

The reaction with coupling agent is carried under the same conditions as used above and proceeds until the desired acid level is obtained. In embodiments, the coupling agent used to form the anti-crater agent includes a polyfunctional isocyanate compound. Any of the conventionally used aromatic, aliphatic or cycloaliphatic monomeric, polymeric or prepolymer polyfunctional (i.e., difunctional or higher) isocyanate compounds can be utilized without particular limitation so long as the isocyanate compound has at least two isocyanate groups in the one molecule. In embodiments, the isocyanate compounds have on average two to six isocyanate groups per molecule. In certain embodiments, the isocyanate compounds have on average two to three isocyanate groups per molecule.

Examples of suitable monomeric isocyanate compounds include, but are not limited to, 1,6-hexamethylene diisocyanate, isophorone diisocyanate, 2,4-toluene diisocyanate, diphenylmethane-4,4'-diisocyanate, dicyclohexylmethane-4,4'-diisocyanate, tetramethylxylylene diisocyanate, and the like. Typical examples of polymeric isocyanate compounds are isocyanurate of 1,6-hexamethylene diisocyanate, biuret of 1,6-hexamethylene diisocyanate, uretdione of 1,6-hexamethylene diisocyanate, isocyanurate of isophorone diisocyanate, biuret of isophorone diisocyanate, uretdione of isophorone diisocyanate, isocyanurate of diphenylmethane-4, 4'-diisocyanate and polymeric diphenylmethane diisocyanate.

Prepolymer isocyanate compounds can also be utilized that are formed from any of the aforementioned organic polyisocyanate and a polyol. Polyols such as polyoxypropylene ethers of glycerol, trimethylolpropane, 1,2,6-hexanetriol, sorbitol can be used. One useful adduct is the reaction product of tetramethylxylylene diisocyanate and trimethylolpropane. In embodiments, an aromatic isocyanate is utilized for better emulsion stability, electrocoat appearance, and corrosion resistance. In certain embodiments, the aromatic isocyanate is the mixture of monomeric and polymeric compounds of diphenylmethane diisocyanate, such as Mondur® MR commercially available from Bayer Corporation.

The terminal cyclic carbonate groups on the di- or higher branched polyester adduct may then reacted in a subsequent reaction with a polyamine compound that contains at least one free tertiary amine group and also additionally contains a primary amine or secondary amine group, to form the final branched polyester-amine adduct that contains terminal tertiary amine groups. Typical polyamines containing at least one tertiary amine and one primary amine or secondary amine that are used include N,N-dimethylaminopropylamine, aminopropylmonomethylethanolamine, N,N-diethylaminopropylamine, aminoethylethanolamine, N-aminoethylpiperazine, aminopropylmorpholine, tetramethyldipropylenetriamine, and diketimine (a reaction product of 1 mole diethylenetriamine and 2 moles methyl isobutyl ketone). In certain embodiments, the polyamine compound is further defined as N,N-dimethylaminopropylarnine. Typically, after the adduct with cyclic carbonate terminal groups described above is formed, the amine that contains primary or secondary amine functions in addition to the tertiary amine functions, and additional solvent are added to the reaction solution and the reaction is continued at elevated temperature until all the cyclic carbonate groups are reacted and converted to terminal tertiary amine groups. The amount of polyamine required will vary from case to case depending upon the desired degree of water solubility needed for the particular end use application. Generally, an equimolar amount of amine to cyclic carbonate is used, however a slight excess of carbonate is acceptable.

In embodiments, a portion of the polyamine utilized in the above reaction can be replaced with an amino-functional alkylalkoxysilane compound to further improve crater resistance. The amino-functional alkylalkoxysilane compound is also reactive with the terminal cyclic carbonate groups and capable of converting these groups to terminal alkoxy silane groups. Examples of suitable amino-functional alkylalkoxysilane compounds are gamma-aminopropyltriethoxysilane, gamma-aminopropyltrimethoxysilane, and N-(2-aminoethyl)-3-aminopropyltrimethoxysilane. In certain embodiments, the amino-functional alkylalkoxysilane compound is further defines as gamma-aminopropyltrimethoxysilane.

In an exemplary embodiment, blends of polyamines and aminoalkylalkoxysilanes are utilized to react with the terminal cyclic carbonate groups to form terminal tertiary amine groups and terminal alkoxy silane groups. The molar ratio of polyamines and aminoalkylalkoxysilanes in the blends may be from about 95:5 to about 60:40 or alternatively from about 95:5 to about 80:20.

The resultant polyester resin composition that is produced above is of low to intermediate molecular weight, having a number average molecular weight of from about 1,000 to about 10,000 or alternatively from about 2,000 to about 6,000, as determined by GPC (Gel Permeation Chromatography) using polystyrene as the standard.

The resultant polyester resin composition is emulsified in water with an organic or inorganic acid, such as lactic acid, acetic acid, formic acid, sulfamic acid, and the like, to fully or partially neutralize the tertiary amine functionality to form the polyester resin dispersion. The polyester resin dispersion can then be added to the electrocoating composition at almost any time. It can be added to the principal emulsion, to the bath, or to the pigment paste. In the pigment paste, pigment is ground with a resin which can be the polyester resin dispersion which also functions as a pigment dispersing resin.

The polyacrylate resin dispersion may be further defined as a water-reducible polyacrylate. The polyacrylate resin dispersion may be formed by first reacting a monomer reaction mixture including one or more acrylate monomers. In embodiments, the reaction proceeds in the presence of a solvent, such as methyl isobutyl ketone. In embodiments, this reaction proceeds at a temperature of from about 115° C. to about 125° C. and in the presence of a catalyst. It is to be appreciated that the reaction may proceed at a temperature of from 110° C. to 160° C. depending on the solvent utilized. An example of a suitable catalyst includes, but is not limited to, 2,2'-azodi(2-methylbutyronitrile). This first reaction may proceed to completion for a time period in an amount of at least 300 minutes.

The reaction mixture may include an alkyl(meth)acrylate monomer, a hydroxy-functional (meth)acrylate monomer, an amino-functional (meth)acrylate monomer, or combinations thereof. It is to be appreciated that the reaction mixture may include other monomers known in the art provided the monomers do not adversely affect the reactivity of the polyacrylate. The alkyl(meth)acrylate monomer may be included in the reaction mixture in an amount of from about 1 to about 99 wt. % based on total weight of all monomers of the reaction mixture. The hydroxy-functional (meth)acrylate monomer may be included in the reaction mixture in an amount of from about 1 to about 99 wt. % based on total weight of all monomers of the reaction mixture. The amino-functional (meth)acrylate monomer may be included in the reaction mixture in an amount of from about 1 to about 99 wt. % based on total weight of all monomers of the reaction mixture.

Examples of suitable alkyl(meth)acrylate monomers include, but are not limited to, methyl methacrylate, ethyl methacrylate, propyl methacrylate (all isomers), butyl methacrylate (all isomers), 2-ethylhexyl methacrylate, isobornyl methacrylate, methacrylonitrile, methyl acrylate, ethyl acrylate, propyl acrylate (all isomers), butyl acrylate (all isomers), 2-ethylhexyl acrylate, isobornyl acrylate, acrylonitrile, and the like. In certain embodiments, alkyl(meth)acrylate monomer is further defined as butylacrylate.

Examples of suitable hydroxy-functional (meth)acrylate monomers include, but are not limited to, 2-hydroxyethyl methacrylate (HEMA), 2-hydroxyethyl acrylate (HEA), hydroxypropyl methacrylate (HPMA), and hydroxypropyl acrylate (HPA), and the like. In certain embodiments, the hydroxy-functional (meth)acrylate monomer is further defined as hydroxypropyl methacrylate (HPMA).

Examples of suitable amino-functional (meth)acrylate monomers include, but are not limited to, t-butylaminoethyl methacrylate (t-BAEMA), N,N-dialkylaminoalkyl acrylates, such as N,N-dimethylaminoethyl acrylate and N,N-diethylaminoethyl acrylate, and N,N-dialkylaminoalkyl methacrylate, such as N,N-dimethylaminoethyl methacrylate and N,N-diethylaminoethyl methacrylate. In certain embodiments, the amino-functional (meth)acrylate monomer is further defined as N,N-dimethylaminoethyl methacrylate.

The resultant polyacrylate resin composition that is produced above is of low to intermediate molecular weight, having a number average molecular weight of from about 4,000 to about 12,000 or alternatively from about 6,000 to about 10,000, as determined by GPC (Gel Permeation Chromatography) using polystyrene as the standard.

The resultant polyacrylate resin composition is emulsified in water with an organic or inorganic acid, such as lactic acid, acetic acid, formic acid, sulfamic acid, and the like, to form the polyacrylate resin dispersion. The polyacrylate resin dispersion can then be added to the electrocoating composition at almost any time. It can be added to the principal emulsion, to the bath, or to the pigment paste. In the pigment paste, pigment is ground with a resin which can be the polyacrylate resin dispersion which also functions as a pigment dispersing resin.

The electrocoating composition may further include a supplemental anti-crater agent. The supplemental anti-crater agent may be further defined as a polyether modified polysiloxane. Examples of suitable polyether modified polysiloxanes are commercially available from Momentive™ under the tradename CoatOSil™, such as CoatOSil™ 2400, CoatOSil™ 2812, CoatOSil™ 2816, CoatOSil™ 3500, CoatOSil™ 3501, CoatOSil™ 3505, CoatOSil™ 3573, CoatOSil™ 7001, CoatOSil™ 7500, CoatOSil™ 7510, CoatOSil™ 7600, CoatOSil™ 7602, CoatOSil™ 7604, CoatOSil™ 7605, CoatOSil™ 7650, CoatOSil™ 77 and CoatOSil™ 7608, and under the tradename Silwet™, such as Silwet™ L-7200, Silwet™ L-7210, Silwet™ L-7220, Silwet™ L-7230, Silwet™ L-7280, Silwet™ L-7550, Silwet™ L-7607 and Silwet™ L-8610. In embodiments, the supplemental anti-crater agent is the polyether modified polysiloxane commercially available as CoatOSil™ 7604. The supplemental anti-crater agent may be utilized in an amount of from 0.01 to 20 wt. % based on a total weight percent of the anti-crater agent utilized in the electrocoating composition.

Turing back to the electrocoating composition, many emulsions utilized in an electrocoating composition include an aqueous emulsion of a binder of an epoxy-amine adduct blended with a crosslinking agent which has been neutralized with an acid to form a water-soluble product. Examples of epoxy-amine adduct based resins are generally disclosed in U.S. Pat. No. 4,419,467 which is incorporated by reference. However, it is to be appreciated that the anti-crater agent may be also utilized with a variety of different cathodic electrocoat resins. Example of acids that may be utilized to neutralize the epoxy-amine adduct include lactic acid, acetic acid, formic acid, sulfamic acid, and the like.

Crosslinking agents for the electrocoating composition are also well known in the prior art. The crosslinking agent may be aliphatic, cycloaliphatic and aromatic isocyanates including any of the aforementioned isocyanates, such as hexamethylene diisocyanate, cyclohexamethylene diisocyanate, toluene diisocyanate, methylene diphenyl diisocyanate, and the like. These isocyanates may be pre-reacted with a blocking agent such as oximes, alcohols, or caprolactams which selectively block the isocyanate functionality. The isocyanates may be unblocked by heating to separate the blocking agent from the isocyanate group of the isocyanate thereby providing a reactive isocyanate group. Isocyanates and blocking agents are well known in the prior art and also are disclosed in the aforementioned U.S. Pat. No. 4,419,467 which is incorporated by reference.

The cathodic binder of the epoxy-amine adduct and the blocked isocyanate are the principal resinous ingredients in the electrocoating composition and may be present in amounts of from about 10 to about 70 wt. %, alternatively from about 20 to about 60 wt. %, or alternatively from about 30 to about 50 wt. %, based on total solids of the electrocoating composition. An electrocoating bath may be formed by reducing the solids with an aqueous medium.

The electrocoating composition further includes pigment which may be incorporated into the composition in the form of a pigment paste. The pigment paste may be prepared by grinding or dispersing a pigment into a pigment grinding vehicle and optional additives such as wetting agents, surfactants, and defoamers. The pigment grinding vehicle may be the anti-crater agent, a conventional pigment grinding vehicle that are well known in the art, or a combination thereof. The pigment may be grinded to a particle size of from about 6 to about 8 according to a Hegman grinding gauge.

The pigments may include titanium dioxide, carbon black, barium sulfate, clay, and the like. In embodiments, pigments having high surface areas and oil absorbencies are utilized in a limited amount due to undesirable effects on coalescence and flow of the coating layer.

The pigment to binder weight ratio may be less than 5:1, alternatively less than 4:1, or alternatively about 2:1 to about 4:1. In embodiments, higher pigment to binder weight ratios may adversely affect coalescence and flow.

The electrocoating composition may further include additives such as wetting agents, surfactants, defoamers, and the like. Examples of surfactants and additional wetting agents include acetylenic alcohols available from Air Products and Chemicals as "Surfynol 104". These additives, when present, may be present in an amount of from about 0.1 to about 20 wt. % based on total binder solids of the electrocoating composition.

The electrocoating composition may further include a plasticizer to promote flow. Examples of suitable plasticizers may be high boiling water immiscible materials such as ethylene or propylene oxide adducts of nonyl phenols or bisphenol A. The electrocoating composition may include the plasticizer in an amount of from about 0.1 to about 15 wt. % based on total resin solids of the electrocoating composition.

The electrocoating composition may be an aqueous dispersion. The terminology "dispersion" as utilized herein refers to a two-phase translucent or opaque aqueous resinous binder system in which the binder is in the dispersed phase and water the continuous phase. The average particle size diameter of the binder phase is in an amount of from about 0.01 to about 1 microns, alternatively about 0.05 to about 0.15 microns, alternatively less than 1 micron, or alternatively less than 0.15 microns. In embodiments, while the concentration of the binder in the aqueous medium is not generally critical, the major portion of the aqueous dispersion is typically water. The aqueous dispersion may include the binder in an amount of from about 3 to about 50 solids wt. % or alternatively about 5 to about 40 solids wt. %, based on total weight of the aqueous dispersion. In embodiments, aqueous binder concentrates which are to be further diluted with water when added to an electrocoating bath may have a range of binder solids of about 10 to about 30 wt. %.

EXAMPLES

Examples below describe the preparation, application, and evaluation of various electrocoating compositions of this disclosure.

I. Preparation of Water-reducible Polyester Resin Dispersion (Anti-crater Agent I)

A highly-branched water-reducible polyester was prepared by charging 266 parts dodecenylsuccinic anhydride, 125 parts glycerin carbonate and 3 parts triphenylphosphine into a suitable reaction vessel and heated to 116° C. under a nitrogen blanket. The reaction was held at 132° C. until an acid number of 132 to 136 was achieved. 266 parts 2-ethylhexyl monoglycidyl ether and 3 parts triphenylphosphine were added and held at 132° C. until an acid number of 0 to 3 was achieved. 266 parts dodecenylsuccinic anhydride and 1 part triphenylphosphine were added and held at 132° C. until an acid number of 56 to 62 was achieved. Add 84 parts xylene and drop the reaction temperature to 116° C. 127 parts Mondur MR (Methylene Diphenyl Diisocyanate) was slowly charged into the reaction vessel. The reaction mixture was held at 116° C. until all of the isocyanate was reacted as indicated by infrared scan. 87 parts dimethylaminopropylamine and 33 parts aminopropyltrimethoxysilane were added and held at 116° C. for one hour. Drop the reaction mixture into a mixture of 2150 parts deionized water and 83 parts lactic acid (80% concentration) and mixed for 30 minutes. The resulting resin dispersion had a nonvolatile of 30% in water.

II. Preparation of Water-reducible Polyacrylate Resin Dispersion (Anti-Crater Agent II)

A water-reducible polyacrylate was prepared by charging 102 parts methyl isobuyl ketone into a suitable reaction vessel and heat to reflux under nitrogen with agitation. 58 parts diethylaminoethylmethacrylate, 121 parts hydroxypropylacrylate, and 270 parts butylacrylate were loaded to monomer feed tank and mixed well prior to feeding to reaction vessel. 8 parts of 2,2'-azodi(2-methylbutyronitrile) and 98 parts methyl isobutyl ketone were loaded to initiator feed tank and mixed well prior to feeding to reaction vessel. The mixture of monomers was charged to reaction vessel simultaneously with initiator mixture over 300 minutes. The initiator mixture was charged to reaction vessel simultaneously with monomer mixture over 330 minutes. After the feed is completed, hold 30 minutes at reflux. Methyl isobutyl ketone was stripped until the % solid at 90% is reached. The resin was dropped into a mixture of 1086 parts deionized water and 33 parts lactic acid (80% concentration) and mixed for 30 minutes. The resulting resin dispersion had a nonvolatile of 26% in water.

III. Preparation of Incorporating Polyether Modified Polysiloxane (Supplemental Anti-Crater Agent)

Commercial available polyether modified polysiloxane from Momentive such as CoatOsil7604 is used in the mixtures of Table 1 below.

TABLE 1

|  | Mixture A | Mixture B | Mixture C | Mixture D |
| --- | --- | --- | --- | --- |
| Anti-Crater Agent I | 1000 parts by weight | 1000 parts by weight | — | — |
| Anti-Crater Agent II | — | — | 1000 parts by weight | 1000 parts by weight |
| Supp. Anti-Crater Agent | — | 53 parts by weight | — | 46 parts by weight |

IV. Preparation of Conventional Crosslinking Resin Solution

Alcohols blocked polyisocyanate crosslinking resin solution was prepared by charging 317.14 parts Mondur MR (Methylene Diphenyl Diisocyanate), 105.71 parts methyl isobutyl ketone and 0.06 parts dibutyl tin dilaurate into a suitable reaction vessel and heated to 37° C. under a nitrogen blanket. A mixture of 189.20 parts propylene glycol mono methyl ether and 13.24 parts trimetylolpropane was slowly charged into the reaction vessel while maintaining the reaction mixture below 93° C. The reaction mixture was then held at 110 C. until essentially all of the isocyanate was reacted as indicated by infrared scan. 3.17 parts butanol and 64.33 parts methyl isobutyl ketone (MIBK) were then added. The resulting resin solution had a nonvolatile content of 75% in MIBK.

V. Preparation of Chain Extended Polyepoxide Emulsion with Conventional Crosslinking Resin Solution The following ingredients were charged into a suitable reaction vessel: 520 parts Epon®828 (Epoxy resin of diglycidyl ether of bisphenol A having an epoxy equivalent weight of 188), 151 parts bisphenol A, 190 parts ethoxylated bisphenol A having a hydroxyl equivalent weight of 247 (Synfac®8009), 44 parts xylene and 1 part dimethyl benzyl amine. The resulting reaction mixture was heated to 160° C. under nitrogen blanket and held at this temperature for one hour. 2 parts dimethyl benzyl amine were added and the mixture was held at 147° C. until an epoxy equivalent weight of 1050 was obtained. The reaction mixture was cooled to 149° C. and then 797 parts conventional crosslinking resin (prepared as II) was added. At 107° C., 58 parts of diketimine (reaction product of diethylenetriamine and methyl isobutyl ketone at 73% nonvolatile) and 48 parts of methyl ethanol amine were added. The resulting mixture was held at 120° C. for one hour and then dispersed in an aqueous medium of 1335 parts deionized water and 61 parts lactic acid (88% lactic acid in deionized water). It is further diluted with 825 parts deionized water. The emulsion was kept agitated until methyl isobutyl ketone had evaporated. The resulting emulsion had a nonvolatile content of 38%.

VI. Preparation of Quaternizing Agent

The quaternizing agent was prepared by adding 87 parts dimethylethanolamine to 320 parts 2-ethylhexanol half-capped toluene diisocyanate in the reaction vessel at room temperature. An exothermic reaction occurred and the reaction mixture was stirred for one hour at 80° C. 118 parts aqueous lactic acid solution (80% concentration) was then added followed by the addition of 39 parts 2-butoxyethanol. The reaction mixture was held for about one hour at 65° C. with constant stirring to form the quaternizing agent.

VII. Preparation of Pigment Grinding Vehicle

The pigment grinding vehicle was prepared by charging 710 parts Epon828 (Diglycidyl ether of bisphenol A having an epoxide equivalent weight of 188) and 290 parts bisphenol A into a suitable vessel under nitrogen blanket and heated to 150° C.-160° C. to initiate an exothermic reaction. The exothermic reaction was continued for about one hour at 150° C.-160° C. The reaction mixture was then cooled to 120° C. and 496 parts of 2-ethyl hexanol half-capped toluene diisocyanate was added. The temperature of the reaction mixture was held at 110° C.-120° C. for one hour, followed by the addition of 1095 parts of 2-butoxyethanol, the reaction mixture was then cooled to 85° C.-90° C. and then 71 parts of deionized water was added followed by the addition of 496 parts quaternizing agent (prepared above VI). The temperature of the reaction mixture was held at 85° C.-90° C. until an acid value of about 1 was obtained.

A. Preparation of Pigment Paste

|  | Parts by Weight |
| --- | --- |
| Pigment grinding vehicle (as prepared above) | 597.29 |
| Deionized water | 1283.95 |
| Lactic acid, 80% | 21.02 |
| Bismuth oxide | 87.06 |
| Titanium dioxide | 419.28 |
| Aluminum silicate | 246.81 |
| Carbon black | 15.27 |
| Barium sulfate | 329.32 |
|  | 3000.00 |

The above ingredients were mixed until homogeneous mixture was formed in a suitable mixing container. Then was dispersed by charging into Eiger mill and then grinding until it pass the Hegman test.

B. Preparation of Electrocoating Baths

TABLE 2

|  | Bath 1 | Bath 2 | Bath 3 | Bath 4 |
| --- | --- | --- | --- | --- |
| Emulsion (prepared above V) | 1650 | 1650 | 1650 | 1650 |
| Deionized water | 1982 | 1988 | 1974 | 1983 |
| Pigment paste (prepared above A) | 314 | 314 | 314 | 314 |
| Mixture A (prepared above III) | 54 | — | — | — |
| Mixture B (prepared above III) | — | 48 | — | — |
| Mixture C (prepared above III) | — | — | 62 | — |
| Mixture D (prepared above III) | — | — | — | 53 |
| Total (parts by weight) | 4000 | 4000 | 4000 | 4000 |

Cationic electrocoating baths were prepared by mixing the above ingredients. Each bath was then ultrafiltered. Each bath was electrocoated at 240-280 volts to obtain 0.8-1.0 mils (20.32-25.4 microns).

The surface roughness of electrocoat cured film was measured by using Taylor-Hobson Surtronic 3+ profilometer. Phosphated cold rolled steel panels were electrocoated and baked at 360° F. for 10 minutes metal temperature. The 0.8 mils to 0.9 mils film build should be obtained. The surface roughness was then measured. The surface roughness of panels with bath 1, bath 2, bath 3 and bath 4 were 9 μin.

ASPP blowout crater and oil contamination tests are two commonly used test methods for checking crater resistance of e-coat film. For ASPP blowout crater test, crater resistance was rated according to the following rating scale of A-E:

A - - - 0-10% defect
B - - - 11-20% defect
C - - - 21-40% defect
D - - - 41-80% defect
E - - - greater than 80% defect The ASPP blowout crater resistance rating for bath 1 was D, bath 2 was A and bath 3 was D and bath 4 was B.

To conduct oil contamination test, 50 PPM Quicker oil was added to the e-coat bath and mixed for 24 hours under low agitation. Each bath was electrocoated to obtain 0.8-1.0 mils film build. For oil contamination test, crater resistance was rated according to the following rating scale of 1 to 5:

1 - - - less than 10 craters
2 - - - 10 to 20 craters
3 - - - 30 to 50 craters
4 - - - 50 to 100 craters
5 - - - greater than 100 craters The oil contamination test for bath 1 was 3, bath 2 was 1, bath 3 was 3 and bath 4 was 1.

PVC sealer adhesion test was also conducted by applying PVC sealer to electric-baked e-coated panel. The thickness of the PVC sealer was 1 mm and baked at 140° C. for 10 minutes metal temperature. The adhesion was rated pass if no sealer can be pulled from e-coated substrate and fail if no sealer can adhere to e-coated substrate. Bath 1, 2, 3 and 4 passed PVC sealer adhesion test.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. An electrocoating composition, comprising:
   an aqueous carrier;
   a film forming binder comprising an epoxy-amine adduct and a blocked polyisocyanate crosslinking agent;
   an anti-crater agent selected from the group consisting of a polyester resin dispersion and a combination of a polyester resin dispersion and a polyacrylate resin dispersion; and
   a supplemental anti-crater agent comprising a polyether modified polysiloxane.

2. The electrocoating composition of claim 1, wherein the polyester resin dispersion is further defined as a highly-branched water-reducible polyester.

3. The electrocoating composition of claim 1, wherein the polyester resin dispersion comprises the reaction product of:
   a hydroxy-functional cyclic carbonate; and
   an aliphatic carboxylic acid anhydride.

4. The electrocoating composition of claim 3, wherein the hydroxy-functional cyclic carbonate comprises glycerin carbonate.

5. The electrocoating composition of claim 3, wherein the aliphatic carboxylic acid anhydride comprises dodecenylsuccinic anhydride, octadecenylsuccinic anhydride, or a combination thereof.

6. The electrocoating composition of claim 3, wherein the polyester resin dispersion comprises the reaction product of:
   a hydroxy-functional cyclic carbonate;
   an aliphatic carboxylic acid anhydride;
   a polyfunctional isocyanate compound; and
   a polyamine compound.

7. The electrocoating composition of claim 6, wherein the polyamine compound is selected from the group of:
   a polyamine having at least one free tertiary amine and one primary or secondary amine group; and
   a combination of a polyamine having at least one free tertiary amine and one primary or secondary amine group, and an aminoalkylalkoxysilane;
   wherein the reaction product is neutralized in the presence of acid and water.

8. The electrocoating composition of claim 6, wherein the polyester resin dispersion comprises the reaction product of:
   a hydroxy-functional cyclic carbonate;
   an aliphatic carboxylic acid anhydride;
   a monofunctional epoxy resin;
   a polyfunctional isocyanate compound; and
   a polyamine compound selected from the group of;
   a polyamine having at least one free tertiary amine and one primary or secondary amine group, and
   a combination of a polyamine having at least one free tertiary amine and one primary or secondary amine group, and an aminoalkylalkoxysilane,
   wherein the reaction product is neutralized in the presence of acid and water.

9. The electrocoating composition of claim 1, wherein the polyacrylate resin dispersion is further defined as a water-reducible polyacrylate.

10. The electrocoating composition of claim 8, comprising a polyacrylate resin dispersion that comprises the reaction product of monomers selected from alkyl(meth)acrylate monomers, hydroxy-functional (meth)acrylate monomers, and amino-functional (meth)acrylate monomers.

11. The electrocoating composition of claim 10, wherein the alkyl(meth)acrylate monomer comprises butylacrylate.

12. The electrocoating composition of claim 10, wherein the hydroxy-functional (meth)acrylate monomer comprises hydroxypropyl methacrylate.

13. The electrocoating composition of claim 10, wherein the amino-functional (meth)acrylate monomer comprises N,N-dimethylaminoethyl methacrylate.

14. The electrocoating composition of claim 1, wherein the anti-crater agent is utilized in an amount of from about 0.01 to about 10 wt. % based on a total weight percent of the electrocoating composition.

15. The electrocoating composition of claim 1, wherein the supplemental anti-crater agent is utilized in an amount of from about 0.01 to about 20 wt. % based on a total weight percent of the anti-crater agent utilized in the electrocoating composition.

* * * * *